United States Patent [19]

Chi

[11] Patent Number: 5,165,497
[45] Date of Patent: Nov. 24, 1992

[54] AUTOMATIC SAFETY DRIVING DISTANCE CONTROL DEVICE FOR A VEHICLE

[76] Inventor: C. Y. Chi, 9Fl.-1, No. 460, Kwang-Fu S. Road, Taipei, Taiwan

[21] Appl. No.: 661,016

[22] Filed: Feb. 26, 1991

[51] Int. Cl.⁵ .......................... B60T 7/16; B62D 1/24
[52] U.S. Cl. ................................. 180/169; 180/170; 180/178; 364/426.04; 340/903; 340/904; 342/71
[58] Field of Search ............... 180/169, 170, 168, 175, 180/176, 177, 178, 179; 364/426.04, 426.01; 340/903, 901, 904; 342/71

[56] References Cited

U.S. PATENT DOCUMENTS

| | | | |
|---|---|---|---|
| 3,892,483 | 7/1975 | Säufferer | 180/169 X |
| 4,079,802 | 3/1978 | Kawata | 180/169 |
| 4,146,891 | 3/1979 | Fujiki et al. | 342/71 |
| 4,491,840 | 1/1985 | Nishikawa et al. | 180/169 X |
| 4,519,469 | 5/1985 | Hayashi et al. | 180/169 |
| 4,622,636 | 11/1986 | Tachibana | 340/904 X |
| 4,628,317 | 12/1986 | Nishikawa et al. | 340/903 |
| 4,692,764 | 9/1987 | Bonar | 342/71 |
| 4,703,429 | 10/1987 | Sakata | 180/170 X |
| 4,757,450 | 7/1988 | Etoh | 180/169 X |
| 4,916,450 | 4/1990 | Davis | 342/71 |
| 4,947,952 | 8/1990 | Kajiwara | 180/169 X |
| 5,014,200 | 5/1991 | Chundrlik et al. | 340/904 X |
| 5,053,979 | 10/1991 | Etoh | 180/170 X |

FOREIGN PATENT DOCUMENTS

| | | | |
|---|---|---|---|
| 923604 | 3/1973 | Canada | 340/903 |
| 1-97448 | 8/1990 | Japan | 180/169 |

Primary Examiner—Charles A. Marmor
Assistant Examiner—Kevin Hurley
Attorney, Agent, or Firm—Cushman, Darby & Cushman

[57] ABSTRACT

Disclosed is an automatic safety driving distance control device for vehicle. The device includes a microcomputer which, within the range of 0-120 km/hr, can adjust the safety distance between the vehicle and the front vehicle according to the speed data transmitted from the speedometer and can automatically control the speed of the vehicle to maintain a safety distance from the front vehicle so as to avoid collision. When the vehicle is moving, the microcomputer calculates the safety distance between both vehicles according to the speed of the vehicle and the actual distance from the front vehicle according to the data from the distance detector. If the distance is too short, it will automatically motivate the brake motor to cause the vehicle to decelerate and the brake lights to turn on; if the distance is too great, it will automatically motivate the acceleration/deceleration motor to cause the vehicle to accelerate so that a safety distance is kept between both vehicles. If the front vehicle stops, then the brake motor and acceleration/deceleration motor will be motivated to stop the vehicle. If the front vehicle moves forward, the acceleration/deceleration motor will also be motivated, and the vehicle moves forward, keeping a safety distance from the front vehicle and maintaining a safety speed according to the value set by the speed limit device.

1 Claim, 4 Drawing Sheets

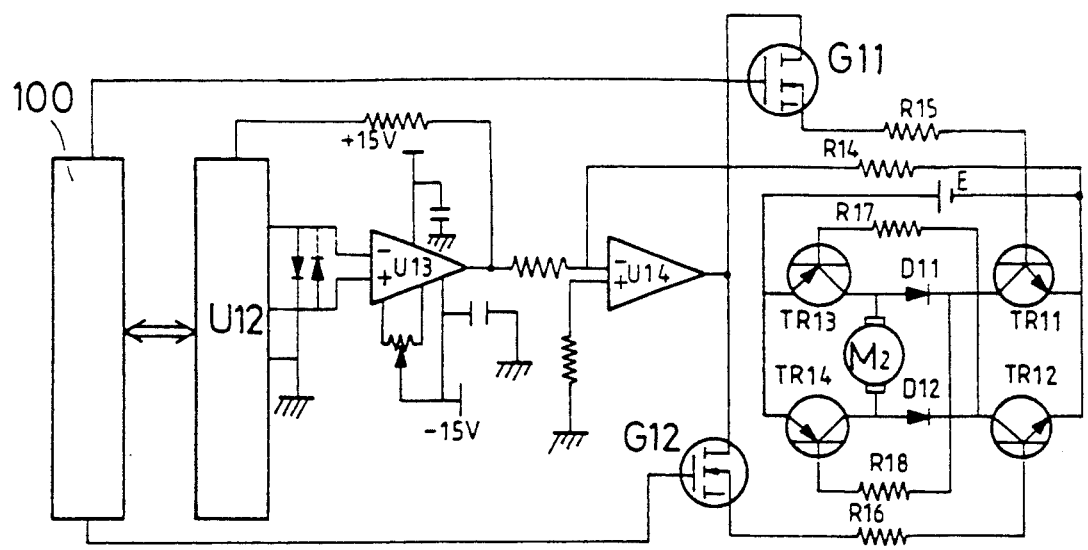
FIG. 5
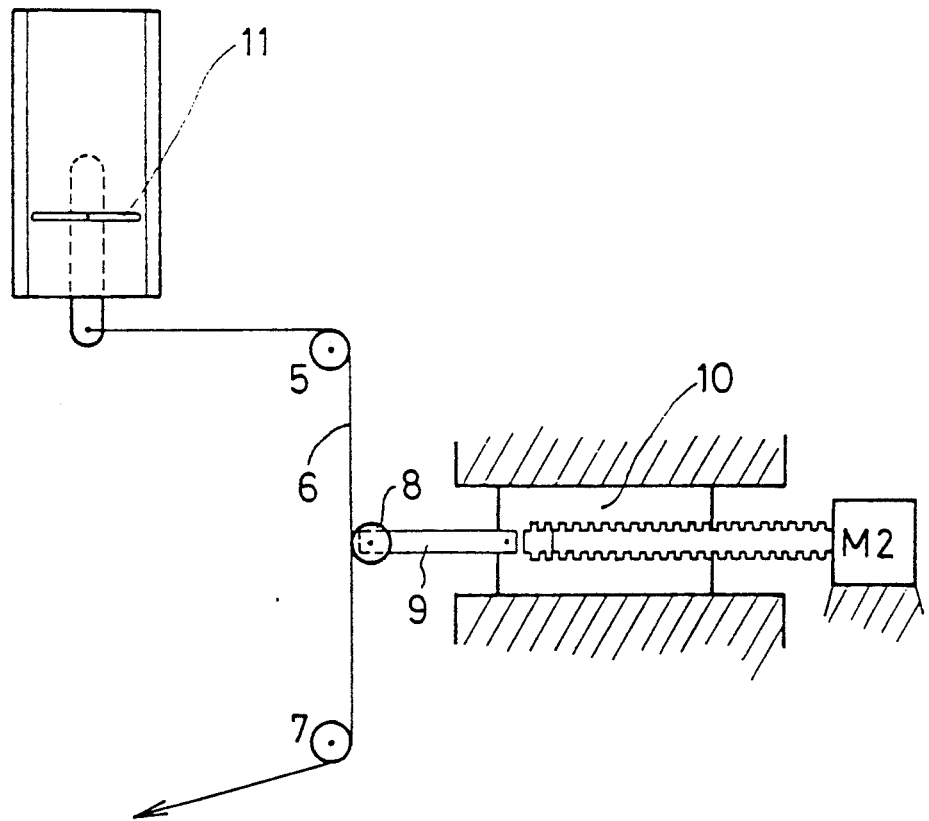
TO ACCELERATION PEDAL FIG. 6

AUTOMATIC SAFETY DRIVING DISTANCE CONTROL DEVICE FOR A VEHICLE

BACKGROUND OF THE INVENTION

According to news reports, chain collision accidents on highways are met frequently. When a car is moving along the highway, it is not easy for the driver to estimate the distance kept between his car and the front car. If the distance between two cars is too short, then when the front car brakes abruptly the car behind may not be able to brake, causing accidents. But if the distance between two cars is too great, then the car behind will keep on pressing the horn or flashing the headlights to urge the front car to move faster. Although the traffic regulations stipulate that at a speed of 60 km/hr, a car has to maintain a distance of 6 car lengths from the front car, and at a speed of 90 km/hr, a distance of 9 car lengths. But it is difficult for the driver to judge how many car lengths there are between his own car and the front car. Moreover, because of health conditions, psychological factors, or a lack of concentration, drivers often fail to brake the cars and cause chain collision accidents. Nowadays there are so many cars in cities that when it rains there are certainly traffic jams. The cars move slowly and have to frequently and alternately stop and move, and the drivers have to keep on stepping on the accelerator, changing shifts, or applying the brakes; all this is not only time-consuming but also exhausting. Air pollution may also result (because the speed of acceleration is not easily controlled, combustion of gasoline may not be complete). What is more, collision may easily happen if the drivers are careless. Although the cars today are usually equipped with automatic shifting systems, the drivers still have to constantly step on the accelerator and/or brakes, while concentrating their attention on maintaining a safety driving distance. To the busy and nervous modern people, this is really very exhausting.

SUMMARY OF THE INVENTION

In view of the above, it is the primary object of the present invention to provide an automatic safety driving distance control device for a vehicle. The control device enables the vehicle to automatically control the distance kept between the vehicle and the front vehicle. According to this invention, the microcomputer calculates the safety distance according to the speed value transmitted from the speedometer and then compares it with the actual distance obtained by the distance detector so as to control acceleration/deceleration motor and brake motor. By this arrangement, the vehicle automatically accelerates in accordance with the forward movement of the front vehicle, and the vehicle automatically decelerates in accordance with the deceleration of the front vehicle. Thus, the distance between the vehicle and the front vehicle is maintained within the safety range according to the speed of the vehicle.

BRIEF DESCRIPTION OF THE DRAWINGS

The other objects, features and advantages of the present invention can be understood and more clearly from the following description and the accompany drawings, in which

FIG. 5 is a diagram showing the arrangement of the acceleration/deceleration motor control circuit;

FIG. 6 is a diagram showing the arrangement of the acceleration/deceleration control apparatus.

DETAILED DESCRIPTION OF THE PREFERRED EMBODIMENT

Figure 1:
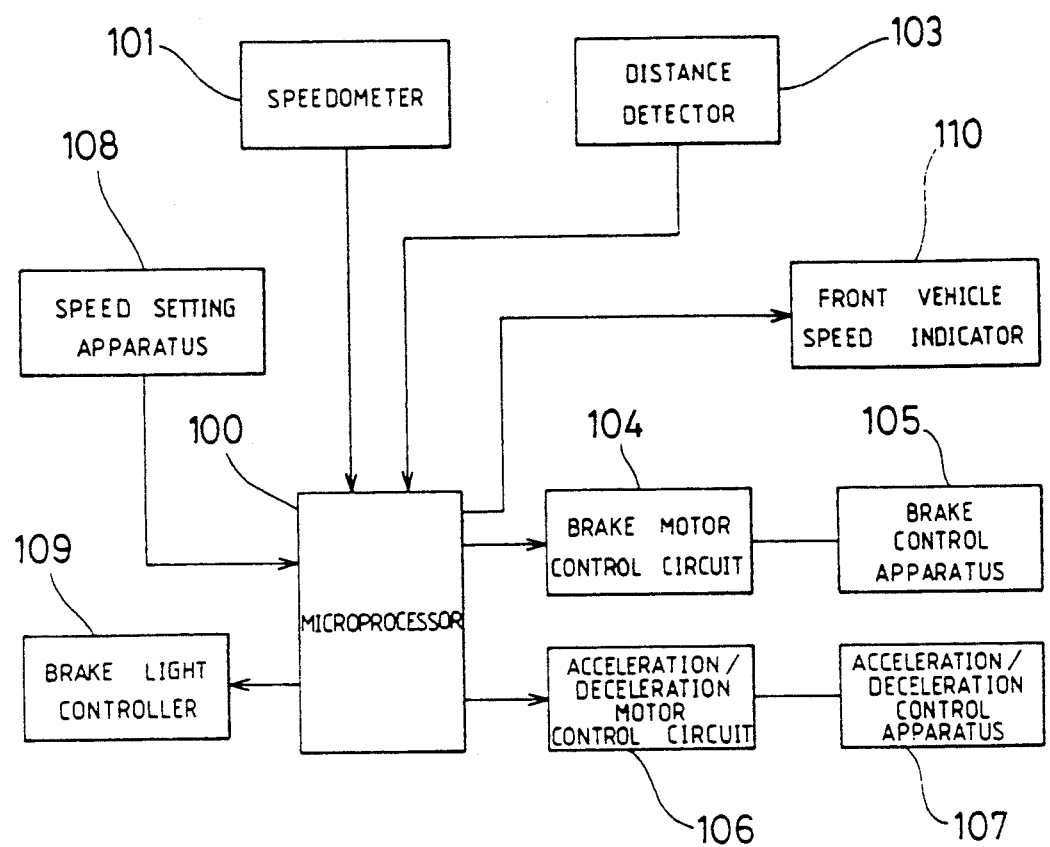
FIG. 1 is a block diagram showing the relationship between apparatuses of the device according to the present invention.

Refer to FIG. 1, which is a block diagram showing the relationship between apparatuses of the device according to the present invention. The automatic control device comprises a microprocessor 100, a speedometer 101, a distance detector 103, a brake motor control circuit 104, a brake control apparatus 105, an acceleration/deceleration motor control circuit 106, an acceleration/deceleration control apparatus 107, a speed setting apparatus 108, a brake light controller 109, and a front vehicle speed indicator 110. When a vehicle is moving, the speedometer 101 transmits the digital data of its speed to the microprocessor 100, the distance detector 103 sends the digital data of the distance between the vehicle and the front vehicle to the microprocessor 100. The microprocessor 100 then calculates the safety distance to be kept between the vehicle and the front vehicle according to its own speed and compare it with the actual distance obtained by the distance detector 103. When the value of the actual distance is smaller than that of the safety distance, the microprocessor 100 will automatically send out signals to the brake motor control circuit 104 and the acceleration/deceleration motor control circuit 106, making the brake control apparatus 105 active and making the acceleration/deceleration control apparatus 107 to supply less gasoline; the vehicle is then decelerated and the actual distance increased. Conversely, when the value of the actual distance is greater than that of the safety distance, the microprocessor 100 will automatically send out signals to the acceleration/decelerator motor control circuit 106, causing the acceleration/deceleration control apparatus 107 supply more gasoline. The vehicle is then accelerated and the actual distance shortened; the vehicle is thus able to catch up with the front vehicle. When its speed is greater than the predetermined value of the speed setting apparatus 108, the microprocessor 100 will send signals to the brake motor control circuit 104 and the acceleration/deceleration motor control circuit 106, making the brake control apparatus 105 active and making the acceleration/deceleration control apparatus 107 to supply less gasoline; the vehicle is thus decelerated to the predetermined value of the speed setting device. When the microprocessor 100 sends signals to the brake motor control circuit 104 or the acceleration/deceleration motor control circuit 106, it simultaneously sends signals to the brake light control 109, causing it to light up before deceleration, or the brake device takes any action so as to warn the vehicles behind to apply the brakes in time to avoid collision.

The speedometer 101 shown in FIG. 1 is a digital speedometer. By being connected in between the speed calbe of the speedometer 101 and the gear box (not shown), it can convert the rotation frequencies of the speed calbe into electric frequency signals and thereafter send them to the microprocessor 100; the microprocessor 100 will then convert such frequency signals into speed values.

The distance detector 103 shown in FIG. 1 is an emitter which emits a photoelectric wave in the form of infrared, ultrasonic, laser, radar or other forms of electromagnetic wave. After the distance detector 103 has detected the reflected wave from the front vehicle, it then calculates the time difference between emission and reception of this wave and therefore the distance; such information is then sent to the microprocessor 100.

The brake light controller 109 shown in FIG. 1 is a relay device. When a signal coming from the microprocessor 100 is in "Hi" voltage, it will directly activates this relay device which then turns on the brake light. This controller 109 is coupled to the existing brake light circuit of the vehicle; therefore, if the controller 109 does not work, the brake light can still be turned on by stepping on the brake. When the microprocessor 100 sends out signals to the brake motor control circuit 104 and/or the acceleration/deceleration motor control circuit 106 to cause the vehicle to decelerate or brake, the "Hi" signal will be simultaneously to turn on the brake lights.

Figure 2:
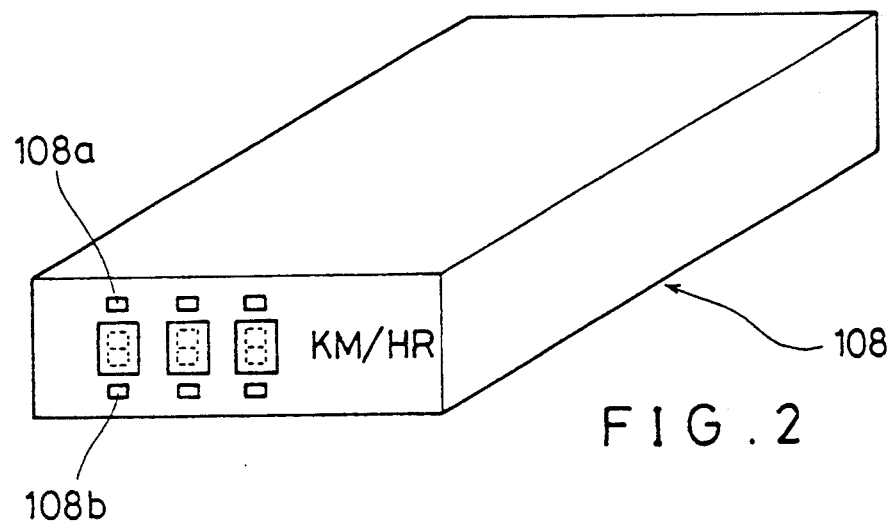
FIG. 2 is a perspective view showing the speed setting device according to the present invention.

FIG. 2 shows the speed setting apparatus 108. It is provided with a set of press-button switches 108a, 108b, ... By pressing the up button 108a or down button 108b to indicate digits on the apparatus 108 the required speed limit value can be set. When the button 108a is pressed, the value of the digit controlled by it is increased. When button 108b is pressed, the value of the digit controlled by it is decreased. The microprocessor 100 can read the value set and control the speed accordingly.

Figure 3:
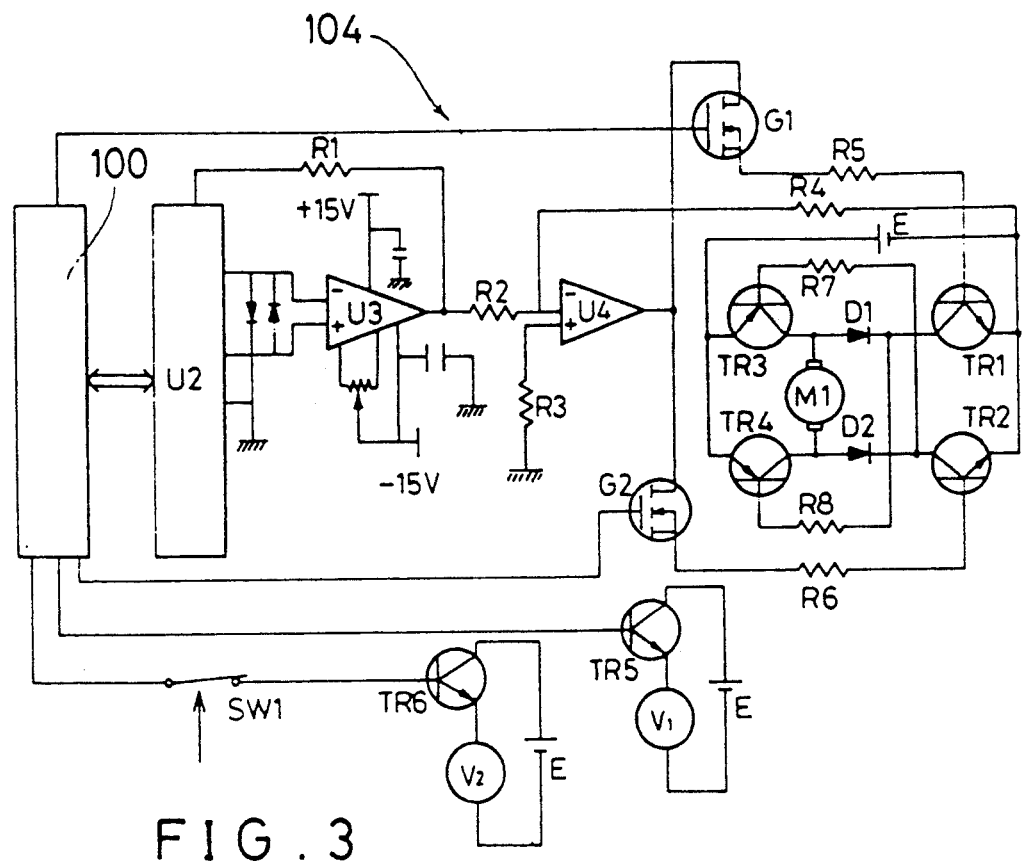
FIG. 3 is a diagram showing the arrangement of the brake motor control circuit according to the present invention.

FIG. 3 shows the arrangement of the brake motor control circuit 104. When the microprocessor 100 judges it to be necessary to apply or release the brakes, it will send corresponding digital values of the rates of applying or releasing the brakes to the D-A converter U2. The D-A converter U2 then converts these digital values into corresponding voltage values and transmit the voltage via amplifiers U3, U4 and switches G1 or G2 to transistor amplification circuit to drive the brake motor. When the microprocessor 100 judges it to be necessary to brake the vehicle, it sends out a "Hi" voltage signal to the switch G1 to turn on the switch G1, and the voltage transmitted from the amplifier U4 is connected to earth via the resistor R5 and the base-emitter junction of transisitor TR1. When current flows through the base-emitter junction of the transistor TR1, making the collector-emitter junction of the transistor TR1 to be conductive, supplying a current flows through the emitter-base junction of the transistor TR4, causing emitter-collector junction of the transistor TR4 to be conductive. At this time, because the transistor TR2 is not yet conductive, the electric current from the positive of electrical source E activates motor M1 to rotate counterclockwisely via the emitter-collector junction of the transistor TR4, and further goes to earth via the diode D1 and the collector-emitter junction of the transistor TR1. Conversely, when the microprocessor 100 judges it to be necessary to stop brake operation, it then stops sending "Hi" signals to switch G1. Simultaneously, it sends out a "Hi" signal to switch G2 to turn on the switch G2, and the voltage transmitted from amplifier U4 is connected to earth via the resistor R6 and the base-emitter junction of the transistor TR2. When electric current flows through the base-emitter junction of the transistor TR2, the collector-emitter junction of the transistor TR2 becomes conductive. Then, electric current flows through the emitter-base junction of transistor TR3, causing the emitter-collector junction of transistor TR3 to be conductive. At this time, because transistor TR1 is not yet conductive, the electric current from the positive pole of electrical source E activates motor M1 to rotate clockwisely via the emitter and the collector of transistor TR3 and further goes to earth via diode D2 and the collector-emitter of transistor TR2. The rotation speed of motor M1 is controlled by microcomputer 100. The microcomputer 100 sends out a set of digital values which are converted into analog voltage by D-A converter U2. These voltages then pass through amplifiers U3, U4, and switch G1 or switch G2 to further motivate sets of transistors TR1, TR4 or transistors TR2, TR3. The greater the voltage, the greater the electric current that passes through motor M1, the faster the rate of rotation, and the faster the rate of starting or releasing the brakes.

Figure 4:
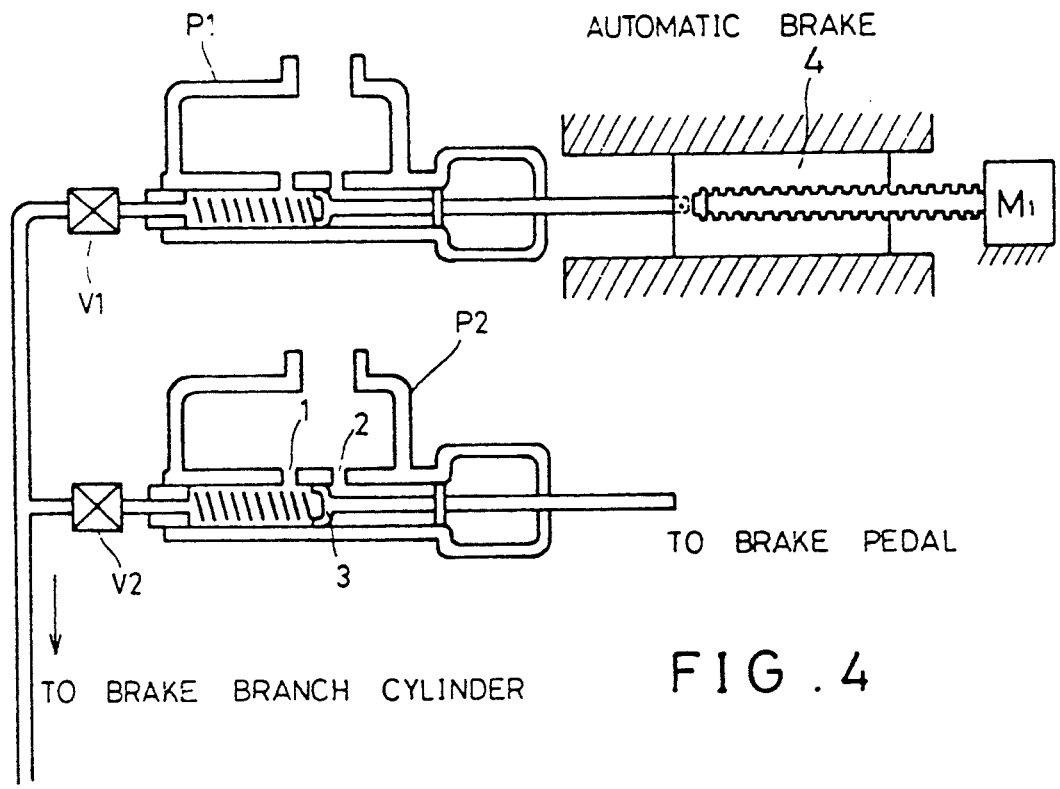
FIG. 4 is a diagram showing the arrangement of the brake control apparatus according to the present invention.

The transistor TR5, electromagnetic valve V1, transistor TR6, electromagnetic valve V2, and the switch SW1 shown in FIG. 3 are used to control the oil circuit of the brake main pumps P1, P2 shown in FIG. 4. When the microprocessor decides to brake through M1, it simultaneously sends out a "Hi" signal to transistor TR5. After being magnified by transistor TR5, the "Hi" signal motivates electromagnetic valve V1 into action, opening up the oil circuit leading from the main pump P1 for automatic braking to the brake branch cylinder. The electromagnetic valve V1 is normally closed; it opens after electricity is connected. At the same time, the microprocessor sends out a "Hi" signal to transistor TR6. After being magnified by transistor TR6, the "Hi" signal motivates electromagnetic valve V2 into action, causing the shut down of the oil circuit leading from the main pump P2 for manual brakes to the brake branch cylinder. This electromagnetic valve V2 is normally open, and it closes after electricity is connected. When the automatic braking motion ends, the signals sent by the microprocessor to transistor TR5 and TR6 change from "Hi" to "Lo"; electromagnetic valve V1 will automatically close while electromagnetic valve V2 will automatically open.

The limit switch SW1 shown in FIG. 3 is a limit switch which is disposed under the brake pedal and is normally closed. When the microprocessor 100 sends out a "Hi" signal to close valve V2, it is via this limit switch SW1. If the brake pedal is pressed down, switch SW1 becomes open, the circuit leading from the microprocessor 100 to valve V2 is cut off, and the electromagnetic valve V2 remains open. Thus, under whatever circumstances, manual brakes can still work efficiently without being affected by the automatic brakes. In addition, the point of motion of the limit switch SW1 can be adjusted to after the pedal is pressed to the point where piston 3 of the manual brake main pump passes the oil return hole 1. Thus, the action of the automatic brakes will not be affected even if the brake pedal is inadvertently pressed.

The automatic brake 4 shown in FIG. 4 is a ballscrew structure. A slider moves left and right within the fixed groove. The screw teeth on the slider engages with the screw lever teeth on the main shaft of the motor. When the motor rotates counterclockwisely, the slider moves to the left, activating the push lever of the main pump P1 of the automatic brakes, causing brake oil to flow into each of the brake branch cylinder. Conversely, when the motor moves clockwisely, the slider moves to the right, withdrawing the push lever of the main pump P1 of the automatic brakes causing brake oil to flow back into the main pump P1. The main pump P2 of the manual brakes is a conventional equipment of a vehicle; the electromagnetic valve V2 is just newly introduced. The oil tubings leading to each of the branch cylinders of the main pump P1 of the automatic brakes can be used together with the main pump P2 of the manual brakes, or they can form a circuit by itself to become a dual circuit brake system.

FIG. 5 shows the arrangement of the acceleration/deceleration motor control circuit. When the microprocessor 100 judges it to be necessary to accelerate/decelerate, it transmits corresponding digital values of the rate of acceleration/deceleration to D-A converter U12, which then converts such digital values into corresponding voltage values which, via amplifiers U13 and U14, and switches G11 or G12, are sent to transition amplification circuit to motivate acceleration motor. When the microprocessor 100 judges it to be necessary to accelerate, it sends out a "Hi" signal to switch G11 to turn on the switch G11, and the voltage transmitted from U14 and controlled via switch G11 is connected to earth via the base-emitter junction of transistor TR11 and resistor R15. When electric current flows through the base-emitter junction of transistor TR11, its collector-emitter junction will be made conductive. Then electric current flows through the emitter-base junction of transistor TR14, causing the emitter-collector junction of transistor TR14 to be conductive. At this time, because transistor TR12 is not yet conductive, the electric current from the positive pole of electrical source E motivates motor M2 to rotate counterclockwisely via the emitter-collector junction of transistor TR14, and further goes to earth via the collector-emitter junction of transistor TR11 and diode D11. Conversely, when the microprocessor 100 judges it to be necessary to decelerate, it stops the "Hi" signal originally sent out to switch G11; at the same time, it sends out a "Hi" signal to switch G12 to turn on the switch G12, and the voltage transmitted from amplifier U14 is connected to earth via the resistor R16 and the base-emitter junction of transistor TR12. When electric current flows through the base-emitter junction of transistor TR12, it will make the collector-emitter junction of the transistor TR12 to be conductive. Then, electric current flows through the emitter-base junction of transistor TR13, causing the emitter-collector junction of transistor TR13 to be conductive. At this time, because transistor TR11 is not yet conductive, the electric current from the positive pole of the electric supply E motivates motor M2 to rotate clockwisely via the emitter-collector junction of transistor TR13 and further goes to earth via the diode D12 and the collector-emitter junction of transistor TR12. The rotation speed of the acceleration motor is controlled by microcomputer 100. The microcomputer 100 sends out a set of digital values which are converted into analog voltages by D-A converter U12. These voltages then pass through amplifiers U13, U14 and switch G11 or switch G12 to further motivate sets of transistors TR11, TR14 or TR12, TR13. The greater the voltage, the greater the electric current that passes through motor M2, the faster the rate of rotation, and the faster the rate of acceleration or deceleration.

FIG. 6 shows the arrangement of the acceleration/deceleration control apparatus. When motor M2 rotates counterclockwisely, the slider of a ball-screw set 10 moves to the left, the coupling lever 9 and the roller 8 disposed thereon also move to the left. Because roller 5 and roller 7 fix the right side of the cable 6; roller 8 pushes the section of cable between roller 5 and roller 7 to move to the left. Since this side of the cable leading to the acceleration pedal is fixed, that side of the cable leading to the throttle valve 11 is pulled to the left, and at the same time, the throttle valve 11 is opened to allow more gasoline flowing into the cylinder; thus the vehicle is accelerated. When deceleration is desire, motor M2 rotates clockwisely and the slider moves back to the right, the coupling lever 9 and the roller 8 disposed thereon also move back to the right, causing the cable 6 to release and the throttle valve 11 to close. The amount of gasoline flowing into the cylinder is consequently reduced, and the vehicle is thus decelerated. Furthermore, the throttle valve 11 can be controlled by the acceleration pedal independent of the acceleration/decleration control apparatus.

The rotation speeds of the brake motor and the acceleration/deceleration motor are both controlled by the microprocessor 100, which works according to the data transmitted from the speedometer and the distance detector.

Figure 7:
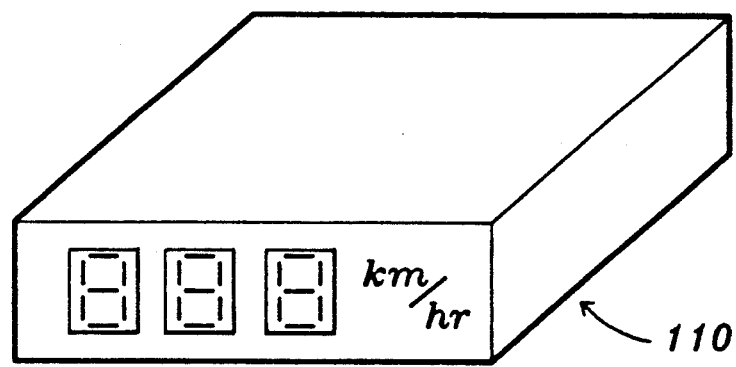
FIG. 7 is a perspective view showing the front vehicle speed indicator.

FIG. 7 shows the front vehicle speed indicator 110. The microprocessor 100 calculates the speed of the front vehicle according to the speed and distance data transmitted from the speedometer and the distance detector; the speed of the front vehicle is then shown in the speed indicator according to the present invention.

The present invention has been described by virtue of a preferred embodiment as above. However, it should be noted that the above description is for illustration rather than restriction and in light of this illustration one skilled in this art can make various modifications without departing from the time spirit and domain of the present invention. Therefore, the scope of this application should be defined by the following claims.

What is claimed is:

1. A safe driving distance control device for a vehicle comprising:
   microprocessor means for calculating a safe distance to be maintained between the vehicle and a second vehicle in front of the vehicle and outputting signals indicative thereof to achieve automatic acceleration/deceleration, automatic braking, automatic safe driving distance control, automatic speed limiting, automatic advance lighting of brake lights, and second vehicle speed indication;
   a speedometer for measuring the speed of the vehicle and providing speed signals indicative thereof to the microprocessor means;
   means for detecting a distance between the vehicle and the second vehicle and providing distance signals indicative thereof to the microprocessor means;
   means for controlling an automatic brake main pump of the vehicle in accordance with the signals provided by the microprocessor means to brake the vehicle, the automatic main brake pump controlling means being coupled to a manual brake main pump of the vehicle to enable the vehicle to be manually braked independent of the automatic main brake pump controlling means;

means for controlling an acceleration/deceleration motor of the vehicle in accordance with the signals provided by the microprocessor means to accelerate/decelerate the vehicle, the acceleration/deceleration motor controlling means being coupled to a manual accelerator of the vehicle to enable the vehicle to be manually accelerated independent of the acceleration/deceleration motor controlling means;

a speed setting device for setting a speed limit, the microprocessor means controlling the speed of the vehicle in accordance with said speed limit to cause the vehicle to automatically decelerate when the speed of the vehicle is greater that the speed limit and to cause the vehicle to automatically accelerate when the speed of the vehicle is less than the speed limit;

means for energizing the brake lights when the microprocessor means provides the signals to one of brake and decelerate the vehicle to cause the brake lights to illuminate prior to braking of the vehicle; and a front car speed indicator for indicating the second vehicle speed, the second vehicle speed being calculated by the microprocessor means in accordance with the speed signals and distance signals provided by the speedometer and the distance detecting means.

* * * * *